June 29, 1948.  J. C. EDWARDS  2,444,342
HEEL REST FOR AUTOMOBILE FLOOR MATS
Filed Jan. 27, 1947
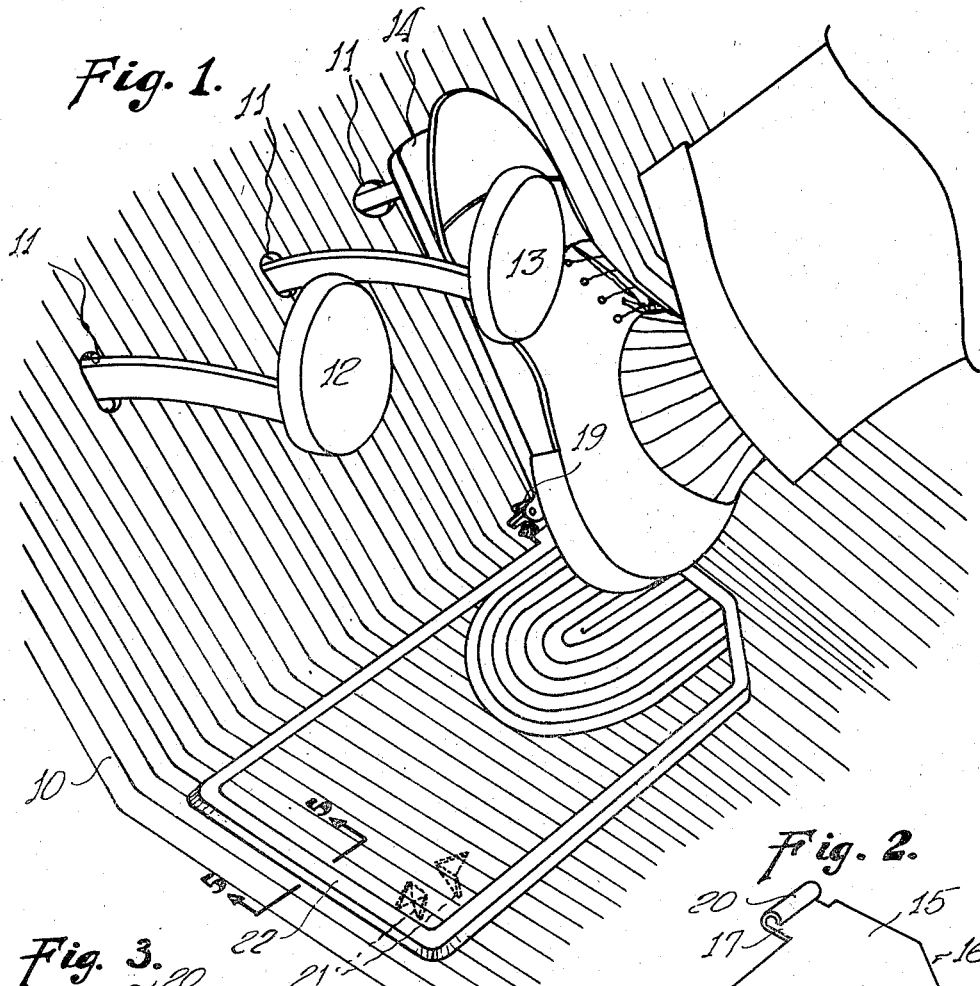
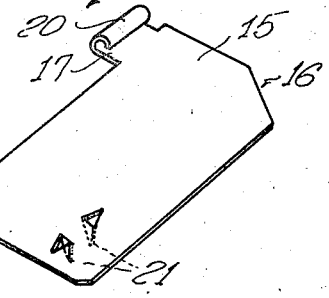
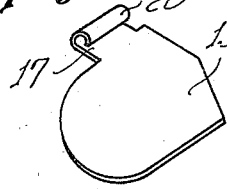
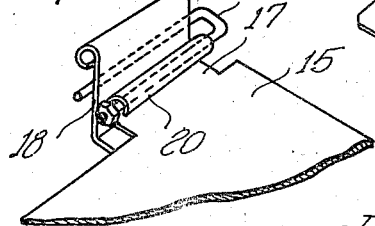
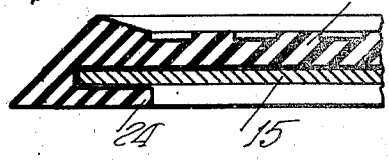
JAMES C. EDWARDS
INVENTOR
ATTORNEY

UNITED STATES PATENT OFFICE 2,444,342

HEEL REST FOR AUTOMOBILE FLOOR MATS

James C. Edwards, Dallas, Tex.

Application January 27, 1947, Serial No. 724,672

4 Claims. (Cl. 180—90.6)

This invention relates to automotive supplies and equipment and more particularly to an accelerator heel rest adapted to overlie and protect from premature wear, that portion of a floor mat adjacent the accelerator or foot throttle of an automobile.

The objects of the invention are; first, to minimize wear on the floor mat by constant frictional engagement therewith by the heel of the operator of the vehicle; second, to provide a medium through which the foot may be more firmly held on the accelerator pedal and third; to provide a heel plate whose connection with the accelerator pedal is such that it is not only held securely against displacement but also may be raised to facilitate cleaning of the floor mat or may be quickly and conveniently detached from the accelerator pedal.

With the foregoing and other objects in view, the invention has particular reference to certain features of accomplishment which will become apparent as the description proceeds, taken in connection with the accompanying drawing wherein:

Figure 1 is a perspective view showing the clutch, brake and accelerator pedals of an automobile as well as the floor mat thereof and illustrating the heel rest of the invention.

Figure 2 is a perspective view of the plate per se constituting the body of the heel rest.

Figure 3 is a perspective view of a modified form of heel rest.

Figure 4 is a fragmentary perspective view showing the hinged connection between the heel rest and accelerator mounting, and, Figure 5 is a fragmentary side view of the heel rest plate and rubber cover in longitudinal section taken on line 5—5 on Figure 1.

Continuing with a more detailed description of the drawing, reference is primarily made to Figure 1 wherein numeral 10 denotes a conventional floor mat overlying the front floor boards of a vehicle and which has appropriately spaced holes 11 to receive the arms of the clutch, brake and accelerator pedals 12, 13 and 14 respectively.

The floor mats of an automobile or truck are subjected to considerable abuse at points immediately below the three pedals 12, 13 and 14 since it is on these points that the operator must rest his heel as a fulcrum to actuate the pedals. Premature wear occurs in the floor mat which not only requires expensive replacement but if permitted to remain, the mat presents a hazard to careful driving because of the insecure support offered the heel of the operator, giving rise to slippage and consequent fouling of the pedals.

The present invention provides a heel rest comprised primarily of a metal plate 15 which may have any desired contour but preferably that shown in Figure 2 which is substantially rectangular and has one corner 16 truncated to a greater depth than the remaining corners to conform to the bulge in the floor of certain automobiles to accommodate the transmission.

The plate 15 is flat and in the form shown in Figure 2 is of a length sufficient to extend below each of the pedals 12, 13 and 14 and thereby serve as a heel rest for both feet. At one corner of the plate 15 there is provided a tab or extension 17 whose end is rolled upon itself but not entirely closed.

In Figure 4 is shown the stationary section 18 of the hinge of the accelerator pedal 14 and the manner in which the plate 15 is hingedly attached to the member 19 associated therewith. The partly formed ferrule 20 on the tab 17 embraces the member 19 of the accelerator hinge, as shown so that the plate 15 may be raised and lowered to facilitate cleaning thereunder.

In order that the heel plate 15 may be firmly anchored against lateral displacement, prongs 21 are struck out from the plate in a downwardly direction and are thrust into the floor mat by pressure imposed on the heel rest. The plate 15 thus is constrained to remain in serviceable position below the pedals and likelihood of accidental slippage is reduced to a minimum.

The plate 15 is concealed by a rubber covering 22 whose edges 23 are preferably beveled in the manner better illustrated in Figure 5 in order that they will offer no obstacle to face movement of the feet. The cover 22 may be molded to present any desired pattern on its exposed upper surface, but one calculated to reduce the likelihood of slippage of the heel thereon. The underedges 24 of the cover underlie the edges of the plate 15 as shown in Figure 5 and in this manner, the cover is held securely on the plate and may be conveniently replaced when worn.

Figure 3 shows a heel rest plate similar in all respects to the plate just described except that it is shorter and accommodates only the accelerator pedal 14. While not shown, a rubber cover of appropriate shape and dimensions is provided for the smaller individual heel rest plate and is secured there in the manner described for cover of the plate 15.

Manifestly the construction as shown and described is capable of some modification and such modification as may be also considered to be within the spirit and intent of the invention.

What is claimed is:

1. As a new article of manufacture, a protector and heel rest for automobile floor mats, comprising in combination with the hinged accelerator pedal of an automobile a plate having a forward extension on one end thereof, shaped to define an open sleeve oscillatably joined to the accelerator hinge of said automobile, said plate being disposed under the rear portion of said accelerator and companion control pedals of said automobile, a rubber cover for the top of said plate and means for anchoring said plate against lateral displacement.

2. As a new article of manufacture, a heel rest for an automobile floor mat including in combination with the accelerator pedal of an automobile, a plate coextensive with the width of said pedal and extending to the rear of its fulcrum and adapted to lie flush on said mat, said plate having a rolled forward extension hingedly connected to the fulcrum of said pedal against lateral movement and a cover for said plate.

3. A protector and heel rest for an automobile floor mat including in combination with the accelerator pedal of an automobile, a flat plate hingedly connected to the fulcrum of said accelerator and adapted to lie flush upon said floor mat under the rear portion of said accelerator, means for holding said plate against horizontal displacement and a removable cover for said plate.

4. A protector plate and heel rest for an automobile floor mat adapted to be disposed under the rear portion of the accelerator pedal of an automobile, said plate having a forward extension hinged to the accelerator pedal fulcrum of said automobile, a cover for said plate and means for holding said plate against other than oscillation in a vertical plane on its hinge.

JAMES C. EDWARDS.

REFERENCES CITED

The following references are of record in the file of this patent:

UNITED STATES PATENTS

| Number | Name | Date |
| --- | --- | --- |
| 1,216,077 | Cohen et al. | Feb. 13, 1917 |
| 1,367,221 | Wilber | Feb. 1, 1921 |
| 1,715,523 | Turner | June 4, 1929 |